350-3.81 SR
XR 3,460,887
CROSS REFERENCE
SEARCH ROOM
2

APPARATUS FOR VIEWING INTERIOR PARTS OF AN EYE AND HOLOGRAPHICALLY RECORDING PHASE AND AMPLITUDE INFORMATION RECEIVED THEREFROM

Filed Dec. 20, 1965 2 Sheets-Sheet 1

INVENTOR.
BERNARD GROLMAN
KENNETH C. LAWTON
Stanley J. Yarner
ATTORNEY

3460887
OR IN 351/7

INVENTOR.
BERNARD GROLMAN
KENNETH C. LAWTON
Stanley J. Yarner
ATTORNEY

United States Patent Office 3,460,887

Patented Aug. 12, 1969

3,460,887

APPARATUS FOR VIEWING INTERIOR PARTS OF AN EYE AND HOLOGRAPHICALLY RECORDING PHASE AND AMPLITUDE INFORMATION RECEIVED THEREFROM

Bernard Grolman, Framingham, and Kenneth C. Lawton, Worcester, Mass., assignors, by mesne assignments, to American Optical Corporation, a corporation of Delaware Filed Dec. 20, 1965, Ser. No. 514,973
Int. Cl. A61b *3/10*
U.S. Cl. 351—7 4 Claims

ABSTRACT OF THE DISCLOSURE

Apparatus for illuminating interior portion of a human eye and for viewing an image thereof as well as recording phase and amplitude information received from said interior portion as a holographic record on film.

This invention relates generally to ophthalmic devices and more particularly to such devices which make use of the principles of holography.

The orthodox photographic recording of an object field involves the object field, its illumination and radiation, an optical imaging system, and a detector (film). While the object may be three-dimensional, only a two-dimensional facsimile is formed and recorded; an energy level is registered for each object point as an image point.

Several significant differences exist between viewing the original object space and the imaged field. While the three-dimensional object field permits the observer to change perspective and to recognize parallax effects, the two-dimensional photographic recording does not. Further, the angular energy distribution radiated from any given object point is determined by the nature of the object surface; while these distributions may be appreciated by the viewer of the object as texture, the spatially modulated amplitude recording (photograph) does not afford this evaluation.

The object of this invention is, therefore, to provide a recording and viewing device for use in ophthalmic applications, which creates an image field possessing every attribute of the original object field.

Assuming, for the sake of simplicity, the coherent illumination of an object, one may visualize that each object point radiates light waves as expanding spherical wavefronts. In any given reference plane, all of these wavefronts manifest a composite complex electromagnetic field, with each elemental wavefront possessing properties of relative phase and amplitude which are characteristic of the object.

If one were able to arrest this ever expanding electromagnetic field and record phase and amplitude information in a given reference plane, all of the information which is uniquely characteristic of the exciting state—the object—would have been preserved. The relative phase of any elemental wavefront and its obliquity to the reference plane is determined by the relative position in space occupied by the radiating object point, while the amplitude of the light wave is determined by that point's reflectance, and the distance of the elemental wavefront from the point.

While both film and retina are sensitive to intensity, neither can detect phase, and, therefore, this channel of information, proceeding from the object field, is forfeited. Interferometry, however, offers a technique for encoding these phase differences as spatial intensity modulations—fringe patterns—which are readily detectable by either film or retina. Such an interferogram, containing both phase and amplitude information uniquely characteristic of the object field, is, in essence, a halograph. By using halography principles in a fundus camera arrangement, a device according to the present invention is constructed to provide many advantages.

Other objects and features of the present invention will become apparent by reference to the following description and accompanying drawings wherein.

Figures 1, 2A, 2B, 3, 8:
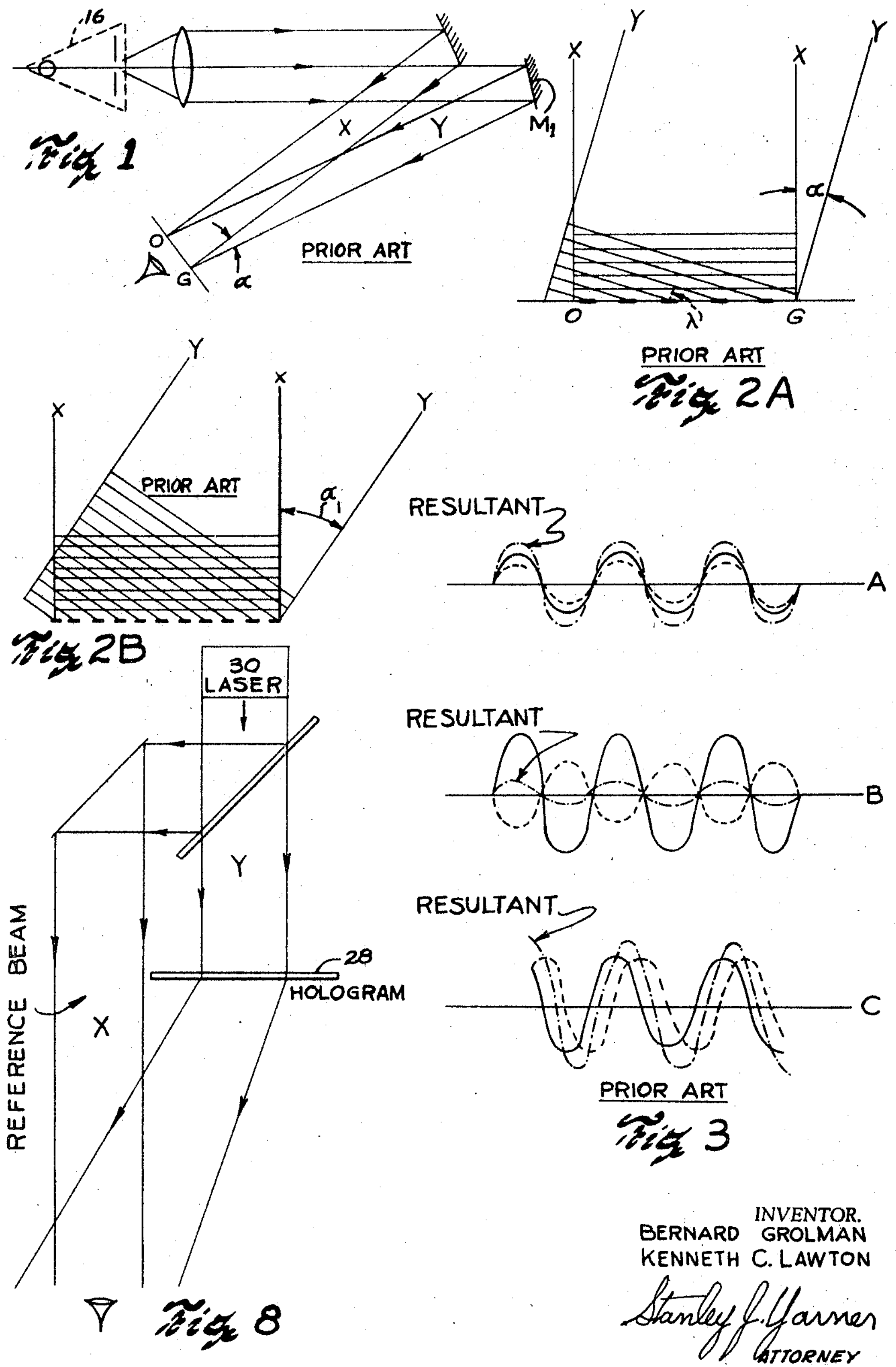
FIG. 1 is a representation of the physical mechanisms used in forming a hologram.
FIGS. 2A and 2B depict the effect of increasing the angle between reference and object beam in a hologram system.
Figures 4, 7:
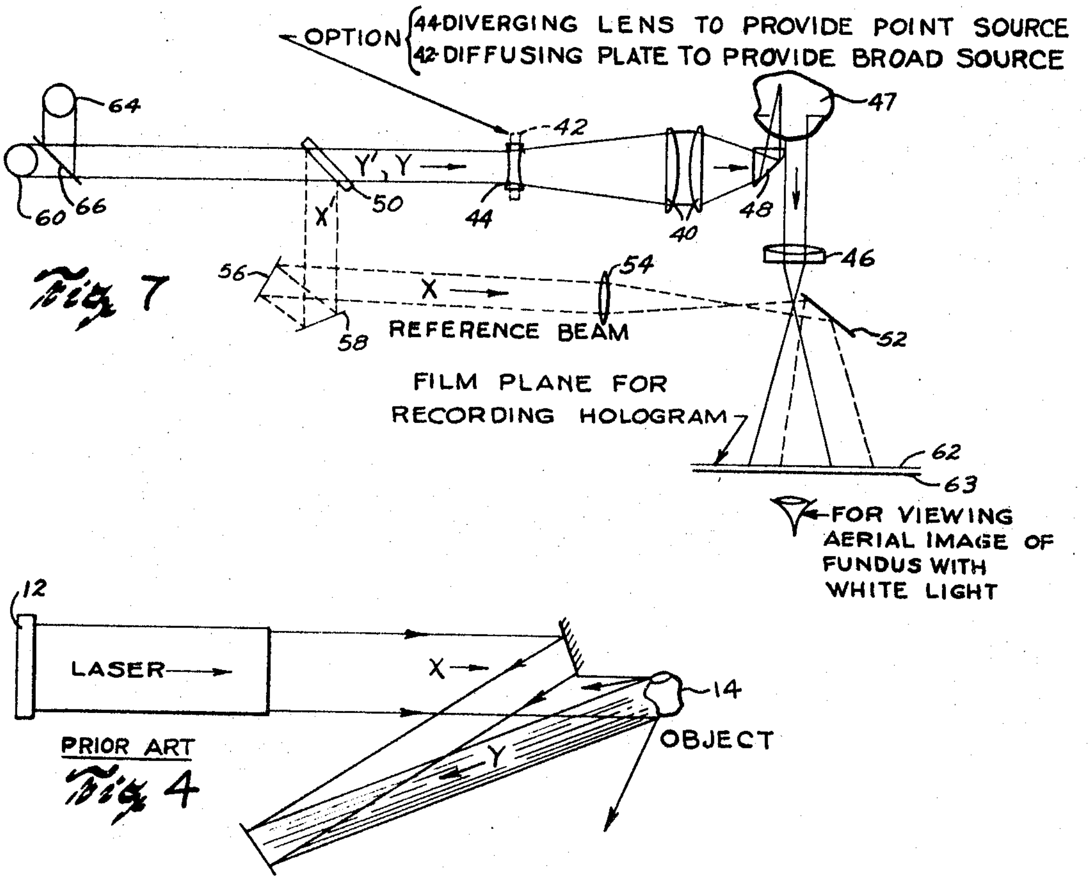
Figure 5:
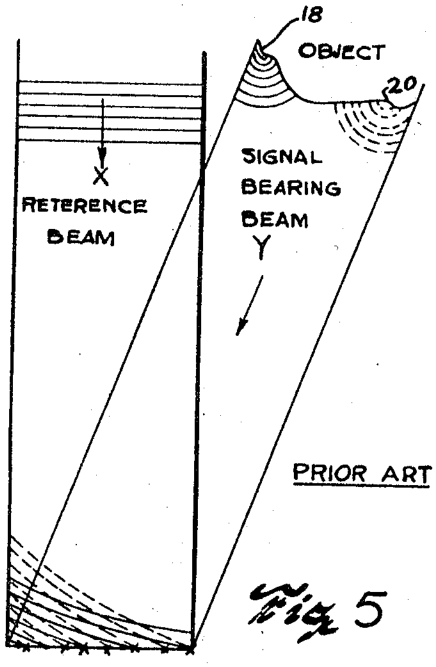
Figure 6:
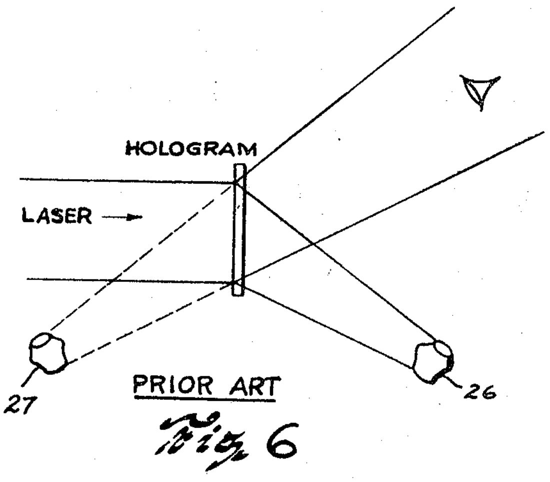

FIGS. 3A, 3B, and 3C are representative plots of amplitude characteristics known in the hologram art;

FIG. 4 is a depiction of a hologram system known in the art wherein a laser source and a complex object are used;

FIG. 5 depicts the fringe spacing of a hologram system made by use of the arrangement of FIG. 4;

FIG. 6 is a representation of reconstruction of the object of FIG. 4 from the hologram according to means presently known in the art;

FIG. 7 is an optical system for a holographic fundus camera according to the present invention; and FIG. 8 is a representation of part of the system of FIG. 7.

The concept of the hologram was described by Dennis Gabor in Procedures of the Royal Society, A 197, p. 454 (1949) and later by Leith and Upatnieks in Journal of the Optical Society of America, vol. 52, p. 1123 (1962). The physical mechanism underlying the formation of a hologram is essentially that which is embodied in the interferometer depicted in FIG. 1.

The superposition of coherent collimated beams X and Y at included angle $\alpha$ results in an alternation of constructive and destructive interference, which, in turn, manifests bright and dark fringes (straight), respectively. It may be seen from FIG. 2A that for a given angle $\alpha$, the spacing between bright or dark fringes in reference plane OG depends upon incrementation of one wavelength path difference between beams X and Y. Wavefronts from each beam arriving in phase interfere constructively, producing an amplitude greater than either of the two individual amplitudes (FIG. 3A); where waves arrive out of phase by one-half wavelength, destructive interference results in a cancellation of amplitude (FIG. 3B). Superposition of waves of intermediate phase relationships (FIG. 3C), and/or unequal amplitudes, will result in intermediate amplitudes—or as observed or recorded, intermediate spatial intensities.

A comparison of FIGURES 2A and 2B reveals that an increase in the angle included between beams X and Y (to angle $\alpha_1$), produces an increase in the maximum path difference at 0 and results in an increase in frequency of alternation or a reduction of the fringe spacing.

The resolution or definition of the fringes is dependent upon several factors worth noting. If the light source is physically broad or extended, it consists of many point sources. Each "point" produces a pair of beams, X and Y, angularly displaced from another pair of beams to an extent which depends upon the separation of the "point sources." Further, the relative phases of trains of waves proceeding from each point, at any given time, are completely independent of each other. With each point producing a set of fringes, the consequence of a relatively broad source is, at best, a composite set of fuzzy or smeared fringes. The condition which the point source satisfies is referred to as spatial coherence.

Recalling that fringe spacing depends upon a one wavelength increment of path length difference, it follows that as chromaticity or wavelength is varied, the fringe spacing varies in direct proportion. The consequence, therefore, of a source which is not strictly monochromatic, is a broadening or a loss of definition in the fringe pattern. The condition of extreme narrow-banded monochromaticity is referred to as temporal coherence. It is feasible, however, to employ three narrow-band sources such as the primary colors, to construct a hologram, which when appropriately illuminated and viewed, will afford a full color image reconstruction.

The simply stated requisites for spatial and temporal coherence belie their severity which, in fact, finds all ordinary light sources inadequate for use in halography except in very special circumstances. The recent advent of the laser, however, with its extreme narrow-band, high energy output, and high degree of collimation, provides light sources which admirably satisfy both spatial and temporal coherence criteria.

FIG. 4 depicts the schematic substitution of a laser source 12 and a complex object 14 for the collimated point source 16 and mirror $M_1$ of FIG. 1. Just as each point on the plane mirror $M_1$ (FIG. 1) serves as a source of radiating spherical wavefronts, so functions each point on the complex object surface. FIG. 5 demonstrates how each point's location in space determines the obliquity of its spherical wavefront to reference beam X which, in turn, governs the resultant fringe spacing. It is worth noting that the wavefront from point 18 has a greater angle of obliquity relative to reference beam X than does point 20. As such, their respective fringe spacing demonstrates the same inverse dependence on obliquity to the reference beam as is illustrated in FIGS. 2A and 2B, i.e. the greater the angle, the smaller the fringe spacing. The reflectance of each point determines the amplitude of its signal bearing radiation propagated within beam Y, FIG. 4. This information is stored for each point by virtue of the contrast it imparts to the fringe pattern because, for a given relative phase, the relative amplitudes of superposed signal bearing and reference wavefronts determine the extent to which extinction or reinforcement of destructive and constructive interference, respectively, take place.

To recapitulate, both amplitude ad phase have been recorded in the hologram. Further, since the signal bearing radiation from each point reaches every point on the hologram, each of the latter point locations contains, in its complex interferometric pattern, essentially the same information. It is interesting to note that if a hologram is broken, any small piece can be used to reconstruct the entire image. Also, the hologram imparts no clues to its viewer of the original object until it is properly reconstructed.

A decoding or signal extraction technique may be exercised on the halogram to reconstruct the original "exciting state"—the object.

If a collimated coherent light beam impinges upon the hologram, as shown in FIG. 6, the effect is as though the previously "arrested" electromagnetic field had been released—permitted to continue propagation without modification to indicate that an interruption had occurred. Significantly, it follows then that no difference exists between viewing the original object field and the reconstructed image field 27.

Uniquely, this virtual image space contains conjugate construction for all object planes, with viewing of different planes requiring the same levels of accommodative and convergence effort attending the viewing of the original object space. Further, the perspective of the scene changes with the viewing position and parallax effects may also be observed. One may literally look around and behind an object in order to see an otherwise occluded object provided that the more distant one had been illuminated when the hologram was made.

The angles at which the diffracted complex wavefronts proceed from any point on the halogram are inversely proportional to the fringe separation at that location. Herein lies the unique complete conjugacy afforded by holography. Relative to the construction of the hologram, it was pointed out that the fringe spacing was inversely proportional to the angle $\alpha$ between reference and signal bearing beams (FIGS. 2A and 2B); in the image reconstruction the diffracted angle is inversely proportional to the fringe spacing. Through this double inverse relationship, the object's spatial integrity is preserved.

Amplitude, originally recorded in the hologram as fringe contrast, is retrieved as local variations in amplitude of the diffracted wave which, in turn, is viewed or imaged as local variations in image intensity.

As indicated in FIG. 6, a second set of wavefronts proceed from the illuminated hologram to produce a real aerial image 26 that may be recorded on film. The convergent wavefronts responsible for this complete image space are produced by the Fresnel zone plate property of the hologram fringe pattern of each object point.

It should be noted that it has not been necessary to employ an image-forming lens system, with its intrinsic limitations on image quality, either in the formation of the hologram, or for the viewing and recording of image space.

An interesting property of the hologram is its ability to store the "images" of many different object spaces on a single film. Reconstruction and viewing of each image, separately, may be accomplished without distraction from the other recorded information.

In the construction of the hologram, as described, the resolving power of the film limits the resolution of the reconstructed image. It is possible, however, to circumvent this restriction by using a reference beam whose vergence is such that it originates (optically) in the same plane occupied by the object. This advantage is, however, achieved at the expense of field extent. A detailed analysis of the role of film resolution in holography has been made by Van Ligten et al. in co-pending U.S. patent application Ser. No. 417,935, filed Dec. 14, 1964, for Hologram System, and similarly assigned to American Optical Company.

Holography offers the vision investigator the opportunity to present a test environment that possesses every attribute of real three-dimensional object space. This presentation may be accomplished without the need of stereoscopic or polarizing aids with their unpredictable artifactual influence. Further, a property of the hologram permits the continuous modification of apparent object distance through change in vergence of the coherent illuminating beam. The viewer must effect appropriate accommodative and convergence levels in order to follow the change in object distance.

In practice, the viewer would be required to look through the hologram. While the fringe pattern offers little or no distraction, it may be reduced essentially to a clear glass plate, with no loss of information, by bleaching the silver opacities of the film.

FIG. 7 is a schematic diagram of a holographic fundus camera with which a hologram 28, FIG. 8, of a model eye was made. Significantly, the wavefront reconstruction results in an image continuum from cornea to fundus affording many of those advantages associated with the viewing of the eye itself. Any plane may be focused for specific inspection and, further, magnification of the image may be varied by modification of the illuminating beam's vergence. Utilizing the enormous data storage capacity of the hologram, it is feasible to record various regions of the fundus on a single film through multiple superimposed exposures. Viewing of a specific field may then be accomplished by appropriately orienting the hologram.

Referring specifically to FIG. 7, there is ilustrated a complete optical system for the holographic fundus camera according to the present invention. The system shown comprises a laser source 60, a source of white light 64, a removable mirror 66, a beam splitter 50, mirrors 56 and 58, a lens 54, either a diffusing plate 42 or a diverging lens 44, condenser lens means 40, a prism 48, a representation 47 of a human eye, an imaging lens 46, mirror 52, and the film plane 62 for recording the hologram. The system is operated, firstly, with mirror 66 in place, as shown, and with the white light source 64 directing light through the beam splitted 50 where said white light is divided into a component Y' and a component X', the Y' component going through either plate 42 or lens 44, depending upon which is to be used in the hologram system, and then through condenser lens means 40 and the prism 48 to the eye 47. The light is then reflected by the eye 47 through the imaging lens 46 and then to the film plane 62. Concurrently, the component X' goes through mirror system 56, 58 and then through lens 54 which diverges the component X' before it impinges upon mirror 52 and reflects to the film plane 62. The white light of the component X' and fundus image resulting from illumination by the component Y' are then viewed at the film plane 62 to see that the system is properly aligned for the section of the fundus of the eye 47 that is to be viewed. After proper alignment has been established, the mirror 66 is removed and laser light is emitted by source 60 through the same system with a hologram film 63 placed in the hologram film plane.

The decision whether to use diverging lens 44 or diffusing plate 42 is made with reference to whether or not detail and pattern recognition, on one hand, or topography of the retina and all in front of it, on the other hand, is desired. The diffusing plate 42 provides a broad source for detail and pattern recognition and the diverging lens 44 is used in forming a point source for topography, if that is what is desired. It should also be noticed that the imaging lens 46 performs a function of imaging the obtained information from eye 47 in the imaging space of the hologram and, as was mentioned before, the lens 54 is for diverging the reference beam before it impinges upon mirror 52. The mirror system 56, 58 is especially useful with the diverging lens 44 so that images in the hologram space are properly oriented for both object beam and reference beam.

In the image viewing and recording techniques described earlier (FIG. 6) two channels of information, phase and amplitude, are retrieved from the hologram exactly as this information radiated from the original object. As discussed earlier, both the recording film and the retina are insensitive to phase and, therefore, only one channel is utilized.

The detection of the second information channel—phase, offers an investigative dimension, untapped by the technique described earlier (FIG. 6). To convert this information into readily detectable amplitude modulation, the reference beam X (FIG. 8) is split off from the coherent source 30 and is then recombined with beam Y which has passed through the hologram 28. The same physical phenomenon of interference, responsible for the formation of the hologram, is operative in producing a fringe pattern which is superimposed over the rear and virtual diffracted images due to "illuminating" beam Y alone.

This interferometrically formed fringe pattern is a manifestation of path length differences. The curvature of the fundus, which functions as a diffuse secondary source, is responsible for each "point source" lying at a different distance relative to a reference viewing or recording plane. When the light reaching that plane is recombined with reference beam X (FIG. 7), the optical path length differences, manifesting relative phase differences in that plane, interfere constructively and destruvtively to produce a fringe pattern characteristic of the contour of the fundus. Performing interferometry upon the hologram of the model eye has enabled the authors to view a fringe pattern which is characteristic of the contour of the "fundus." In the living eye other possible path length differences may arise from inhomogeneities of index in corneal, lenticular, or vitreous bodies.

The precise relative determination of fundus curvature may afford a sensitive means of detecting pathologically induced departures or discontinuities in fundus contour. The detection of localized lenticular changes, probable precursors of cataractous changes, may provide a valuable research technique in the quest for a therapeutic approach.

Furthermore, it may be seen from the foregoing that the present invention is useful as an ophthalmic device for viewing almost any part of the sphere-like human eye.

We claim:

1. Holographic apparatus for recording on film at an image plane of said apparatus phase and amplitude information received from an interior light-reflective portion of a human eye, said apparatus comprising a source of coherent illumination, beam splitter means so positioned in the path of coherent radiation emitted by said source as to divide said radiation into first and second differently directed beams, a first optical system for directing said first beam into an eye so as to illuminate an interior reflective portion thereof, a second optical system comprising mirror and lens means for directing the radiation of said second beam as a reference beam to an image plane of said apparatus, image-forming lens means positioned in optical alignment with said eye so as to receive light rays coming from said reflective interior portion and focus same at the image plane of said apparatus, and holographic film means disposed at said image plane so as to be exposed to the light rays of said second beam and light rays from said eye in superimposed relation thereon.

2. The invention according to claim 1 wherein said first optical system comprises a diffusing plate for providing a broad source of coherent light for detail and pattern recognition of the interior portion of said eye.

3. The invention according to claim 1 wherein said first optical system comprises a diverging lens for providing a small source of illumination for topographic examination of the interior portion of said eye.

4. The invention according to claim 1 wherein said second optical system comprises a second mirror for reflecting the radiation received from said first mirror in such a manner as to orient said second beam to match the orientation of the light rays coming from the interior of said eye and being imaged at said image plane.

References Cited

Leith et al., "Wavefront Reconstruction With Diffused Illumination and 3-dimensional Object," JOSA, vol. 54, No. 11, November 1964, pp. 1295–1301.

Guber, "Character Recognition by Holography," Nature, vol. 208, Oct. 30, 1965, pp. 422–423.

Stroke et al., "Attainment of High Resolutions in Holography by Multi-Directional Illumination and Moving Scatterers," Physics Letters, vol. 15, No. 3, April 1965, pp. 238–240.

DAVID SCHONBERG, Primary Examiner

PAUL A. SACHER, Assistant Examiner

U.S. Cl. X.R.

350—3